Mar. 3, 1925. 1,528,727
J. H. DURKEE
RIM EXPANDER FOR VEHICLES
Filed Oct. 25, 1923
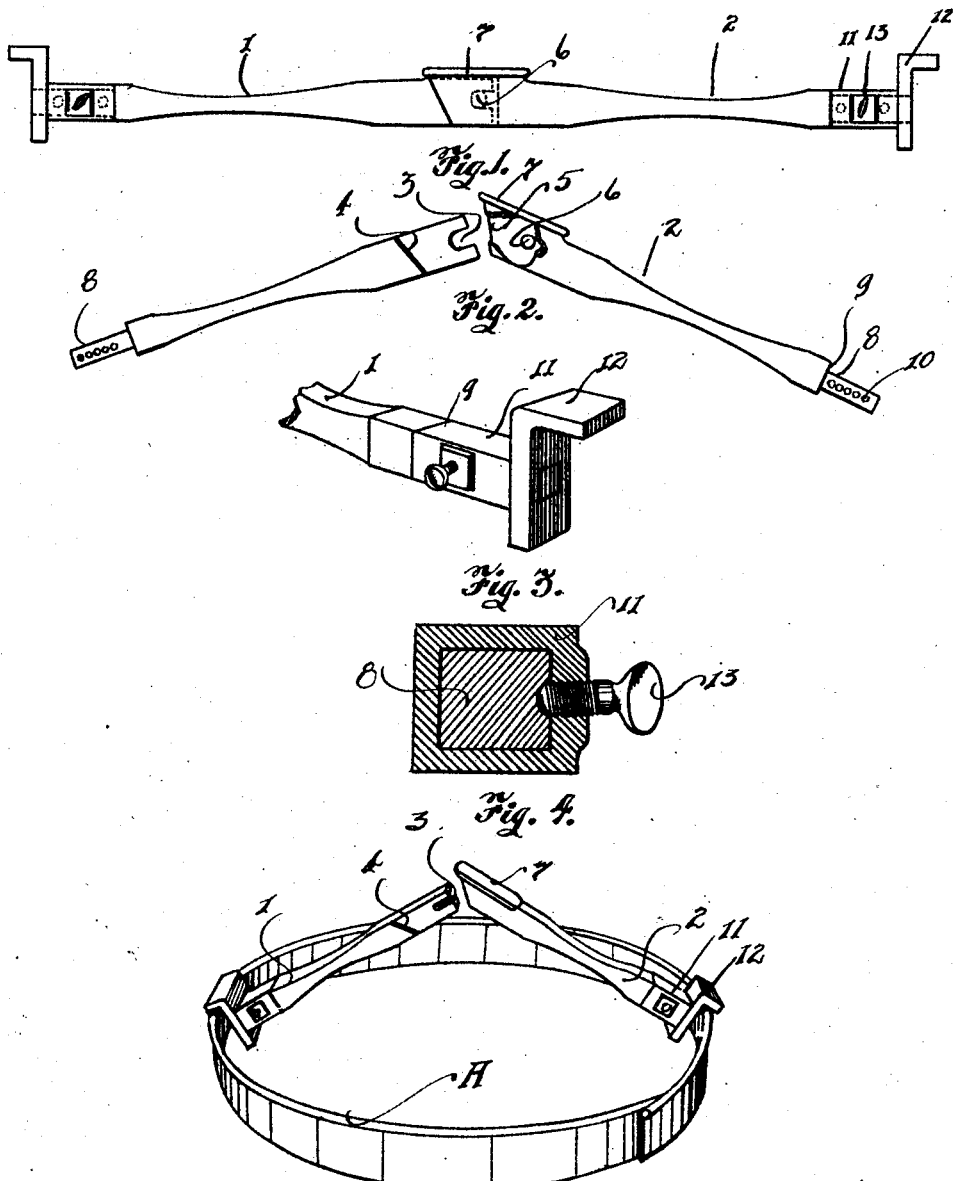
James H. Durkee
INVENTOR.
BY John M. Spellman
ATTORNEY Patented Mar. 3, 1925.

1,528,727

UNITED STATES PATENT OFFICE.

JAMES H. DURKEE, OF DALLAS, TEXAS, ASSIGNOR OF FORTY-FIVE PER CENT TO JOSEPH A. RICHKER, OF DALLAS, TEXAS.

RIM EXPANDER FOR VEHICLES.

Application filed October 25, 1923. Serial No. 670,664.

*To all whom it may concern:*

Be it known that I, JAMES H. DURKEE, a citizen of the United States, residing at Dallas, in the county of Dallas and State of Texas, have invented certain new and useful Improvements in Rim Expanders for Vehicles, of which the following is a specification.

This invention relates to motor vehicles and in such connection it relates more particularly to a rim expander for such vehicles.

The principal object of the invention is to provide a device as referred to above which shall have the qualifications of providing a means for expanding the rims of motor vehicles, particularly those of the old style type of rim, in order to enable it to be replaced on the wheel.

The invention has the further object of being collapsible and occupying small space, and is simple, durable and economical of manufacture.

The invention will be more fully understood by reference to the following description, taken in connection with the accompanying drawings, forming part hereof, and in which—

Figure 1 is a side elevational view of the rim expander in its extended position and removed from the rim.

Figure 2 is a similar view, the two halves of the expander being disconnected.

Figure 3 is a detail sectional view, illustrating the rim-engaging ends.

Figure 4 is an enlarged cross-sectional detail view of one of the sections adjacent the rim-engaging members; and Figure 5 is a perspective view of the rim expander in position on an automobile rim.

Referring to the drawings more in detail, the rim expander comprises two separable arms 1 and 2. The arm 1, as is shown in Figures 2 and 5, has a slot 3 in its inner end, this end being thinner than the body part and having a shoulder 4 on each side. This thin portion is for the purpose of permitting the inner end of arm 1 to be passed or received into a recess 5 in arm 2 and wherein is a pin 6 to receive the slot 3 in arm 1. In this manner the two arms are pivotally engaged. The outer end of arm 2 is cut obliquely to bear against the correspondingly-shaped shoulder 4 to form a perfect fit. Above the recess 5 is a foot rest 7, which may be on either of the arms.

The outer parts of the arms 1 and 2 are reduced in size to form a spindle-shaped end 8 with shoulders 9—9. The ends 8—8 are indented at 10—10 and these ends are arranged to be passed into an opening in a rim-engaging member 11. This member has an outer part 12 which as shown engages over the rim A, see Figure 5. The indentations 10 are for adjusting the arms to different sized rims by means of the screws 13.

In operation, pressure of the foot upon the foot-rest 7 will expand the rim to normal circumference. The device is strong and very durable, and owing to its collapsible feature, occupies small space.

It should be understood that the device is capable of modification and minor changes, within the scope and meaning of the following claims:

1. A vehicle rim expander comprising two members of substantially the same longitudinal extent detachably and pivotally connected to each other at their inner ends, a rim engaging element adjustably mounted on the outer ends of each of said members, and a foot rest attached to one of said members adjacent to and adapted to extend over the point of pivotal connection of the two members.

2. A vehicle rim expander comprising two members of substantially the same length, means for pivotally and detachably connecting the members to each other comprising a reduced and slotted portion on one member, a recessed portion on the other member, and a projection in said recessed portion, the reduced portion being adapted to be received into the recessed portion with the projection engaging in the slot, and a rim engaging element adjustably mounted on the outer end of each of the members.

In testimony whereof I have signed my name to this specification.

JAMES H. DURKEE.